March 18, 1941.  J. M. MASKULKA ET AL  2,235,323

PARING TOOL

Filed Nov. 28, 1939

Joseph M. Maskulka,
Stephan Zdelar
INVENTORS,

BY W. B. Harpman
ATTORNEY.

Patented Mar. 18, 1941

2,235,323

UNITED STATES PATENT OFFICE 2,235,323

PARING TOOL

Joseph M. Maskulka and Stephan Zdelar,
Youngstown, Ohio

Application November 28, 1939, Serial No. 306,503

2 Claims. (Cl. 30—278)

This invention relates to a device designed for paring vegetables or fruit such as potatoes, apples and the like.

The principal object of the invention is the provision of a paring tool provided with a curved blade adapted to more readily follow the curved contour of the vegetable or fruit being pared.

A further object of the invention is the provision of means on the said paring tool for cutting away the eyes of potatoes or spoiled portions of the fruit or vegetable being pared.

A further object of the invention is the provision of a paring tool the curved cutting blade of which is pivotally mounted in an area adjacent the handle portion, which handle portion is provided with oppositely disposed depressions adapted to receive the fingers, the leading edges of the handle adjacent the depressions being curved so as to form guards for the finger tips.

A still further object of the invention is the provision of a curved cutting blade having dual cutting edges oppositely opposed from one another one of which serves as a guide in determining the cutting angle of the other when used in paring and which cutting blade is centrally pivoted at each of its ends so that it may almost completely rotate in relation to its supports thus making it possible to use the paring tool with either its top or bottom in cutting relation to the article being peeled as the blade will adapt itself accordingly.

Specifically, the paring tool forms a device which may be easily handled or manipulated so as to facilitate peeling operation which it is designed to accomplish, and which device operates with noticeable ease and efficiency by reason of the provision therein of a narrow curved blade. Also, by reason of the formation and shape of the handle with relation to the blade, a noticeable ease and efficiency of operation is obtained and the fingers engaging the tool are adequately protected at all times by the guard like construction of the leading edges of the handle itself.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in the accompanying drawing, wherein.

Figure 1:
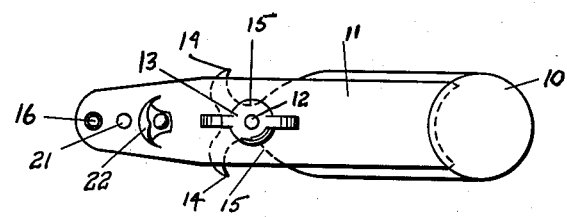
Figure 1 is a side elevation of the paring tool constructed in accordance with the invention.
Figure 2:
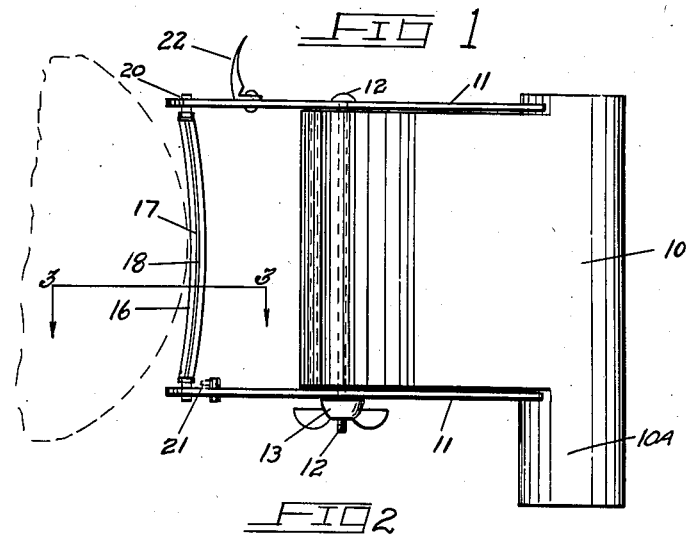
Figure 2 is a top plan view thereof.

By referring to the drawing and Figures 1 and 2 in particular, it will be seen that a handle 10 has positioned on either side of it a pair of oppositely disposed arms 11 which arms 11 are secured to the handle by means of a bolt 12 having a nut 13 thereon. Still referring to the handle it will be seen that forward edges 14 thereof have been curved upwardly and outwardly in the form of guards in relation to oppositely disposed depressions 15 formed continuously across the upper and lower surfaces of the handle which depressions are adapted to receive the fingers of the user of the tool and provide an adequate grip and at the same time adequately protect the fingers from accidental engagement with a cutting blade 16 pivoted between the outer most ends of the arms 11.

Figure 3:
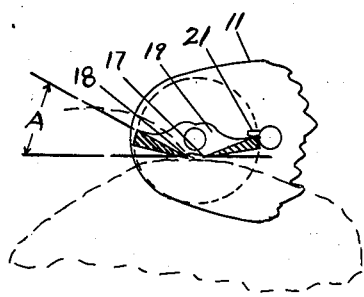
Figure 3 is a greatly enlarged sectional view taken on lines 3—3 of Figure 2.
Figure 4:
Figure 4 is a side elevation of the knife member shown in Figures 2 and 3.
Figure 5:
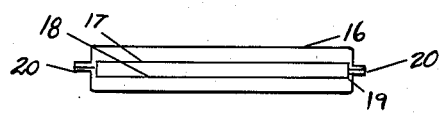
Figure 5 is a top plan view of the knife member shown in Figures 2 and 3.

By referring to Figures 3 and 4 of the drawing it will be seen that this blade 16 comprises a section of suitable material formed into a pair of opposed cutting edges 17 and 18 each of which is tapered in relation to the other end in relation to the end sections 19 of the blade which are provided with projections 20 which engage openings in the outermost ends of the arms 11.

By referring to Figure 3 it will be seen that a rivet 21 has been affixed to one of the arms 11 at approximately the center line of the arm 11 thus in line with the projection 20 of the blade 16, this rivet 21 serving as a means of preventing the complete rotation of the blade 16 in relation to the arm 11. Its positioning will permit the blade to be reversed in relation to the arm 11 so that the blade may conceivably follow a paring surface even through the cutting is taking place adjacent the upper portions of the device instead of the lower.

By referring to Figures 2 and 4 it will be seen that the curved structure of the blade 16 and the dual cutting edges 17 and 18 thereof make it possible to use this paring tool as a slicer keeping it continually engaged with the surface of the article being pared and moving it back and forth thus cutting alternately with the edges 17 and 18.

By again referring to Figures 1 and 2, additional details of the handle 10 may be seen which details comprise a circular extension 10A of the handle which, in effect, serves as a section suitable for placement in the palm of the hand thus making the operation and use of the paring tool extremely convenient. In Figures 1 and 2 a spoon shaped cutter 22 may be seen affixed to one of the arms 11. This spoon shaped cutter is adapted to be used in removing the eyes of potatoes and spoiled spots in other fruits and vegetables. It will, of course, be obvious that this paring tool may be readily used by either right or left handed persons and that it is not, as has been customary, limited to the operation by a right handed person.

Still referring to Figures 1 and 2 it will be seen that by simply loosening the nut 13 on the bolt 12 the arms 11 may be moved sufficiently to permit the replacement of the blade 16 from time to time if this should be necessary or desirable. This compares with the heretofore comparable structures definitely placing the blade in a certain position during the formation of the tool. In addition to this it is possible to substitute a heavier blade suitable for shredding so that the paring tool may be used as a shredder for cabbage or for cutting potato chips and the like.

By again referring to Figure 3 of the drawing it will be seen that the taper of the cutting blade in relation to the article under treatment is controlled by the surface engagement of the trailing edge of the opposite blade. For example, in this figure the trailing edge 18 as compared with the taper of the blade as indicated by the angle A in this view definitely controls the pitch of the cutting blade and keeps it at desirable cutting depth at all times regardless of the contour of the article being pared. When the blade is passing back and forth over an article this action reverses alternately and the blades 17 and 18 alternate in leading and cutting duties.

It will be noted that the blade shown in the drawing is curved to fit the approximate curvature of a potato or apple or similar article and that due to this curvature a considerably wider area is peeled with one stroke than with any of the peelers heretofore known to the art. It will also be noted that the curvature is not great enough to interfere with the utility of the blade on larger articles but it will be found most efficient on articles of the size mentioned.

It will thus be seen that a paring tool has been designed which may be alternately used for paring potatoes, apples and the like and as a shredding or cutting tool by simply changing the cutting blade thereof. It is obvious that the handle portion permits the more ready use of the tool and that it provides definite protection for the fingertips. It is also obvious that the tool is formed of a few simple parts readily assembled thus making it extremely economical in manufacture and sale.

What we claim is:

1. A paring device of the character described comprising a body including a handle member and a pair of spaced supports, a bolt passed through the said spaced supports and handle and adapted to hold the same in operative position thereon, the said handle formed with a palm engaging portion and oppositely disposed finger grip portions, together with out turned finger tip protecting portions and a curved cutting blade pivotally mounted between said spaced supports, said curved cutting blade embodying a pair of end members, a pair of blades secured to the said end members and disposed in spaced relation to one another and at opposite angles to one another so that one blade provides a guide for the other in following the contour of an article being pared, projections extending outwardly from the said end members for pivotal engagement with the said supports.

2. A paring device of the character described comprising a body including a handle member and a pair of spaced supports removably affixed thereto by bolt means, the said handle formed with a palm engaging portion and oppositely disposed finger grip portions, together with out turned finger tip protecting portions and a curved cutting blade pivotally mounted between said spaced supports, said curved cutting blade embodying a pair of end members, a pair of blades secured to the said end members and disposed in spaced relation to one another and at opposite angles to one another so that one blade provides a guide for the other in following the contour of an article being pared, projections extending outwardly from the said end members for pivotal engagement with the said supports, together with a rivet affixed to one of the said space supports adapted to prevent the complete rotation of the said curved cutting blade.

JOSEPH M. MASKULKA.
STEPHAN ZDELAR.